(12) United States Patent
Ye et al.

(10) Patent No.: US 11,251,908 B2
(45) Date of Patent: Feb. 15, 2022

(54) ADVANCED CODING ON RETRANSMISSION OF DATA AND CONTROL

(71) Applicant: IDAC Holdings, Inc., Wilmington, DE (US)

(72) Inventors: Chunxuan Ye, San Diego, CA (US); Kyle Jung-Lin Pan, Saint James, NY (US); Fengjun Xi, San Diego, CA (US)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/473,552

(22) PCT Filed: Jan. 5, 2018

(86) PCT No.: PCT/US2018/012487
§ 371 (c)(1),
(2) Date: Jun. 25, 2019

(87) PCT Pub. No.: WO2018/129254
PCT Pub. Date: Jul. 12, 2018

(65) Prior Publication Data
US 2019/0334659 A1  Oct. 31, 2019

Related U.S. Application Data

(60) Provisional application No. 62/443,028, filed on Jan. 6, 2017.

(51) Int. Cl.
*H04L 1/18* (2006.01)
*H04L 1/00* (2006.01)

(52) U.S. Cl.
CPC .......... *H04L 1/1812* (2013.01); *H04L 1/0041* (2013.01); *H04L 1/0057* (2013.01);
(Continued)

(58) Field of Classification Search
None
See application file for complete search history.

(56) References Cited

U.S. PATENT DOCUMENTS

2017/0207884 A1*  7/2017  Jiang ...................... H04L 1/1845
2017/0359086 A1* 12/2017  Kudekar ........... H03M 13/6505
(Continued)

FOREIGN PATENT DOCUMENTS

| CN | 101388674 A | 3/2009 |
| CN | 101924619 A | 12/2010 |

(Continued)

OTHER PUBLICATIONS

3rd Generation Partnership Project (3GPP), R1-1612306, "On the hardware implementation of channel decoders for short block lengths", AccelerComm, TSG RAN WG1 Meeting #87, Reno, USA, Nov. 2016, 9 pages.

(Continued)

*Primary Examiner* — Anh Vu H Ly
(74) *Attorney, Agent, or Firm* — Condo Roccia Koptiw LLP

(57) ABSTRACT

Systems, methods, and instrumentalities are disclosed for advanced coding on retransmission of data and/control information. The systems methods, and instrumentalities may include one or more of the following: chase combining for retransmission; incremental redundancy (IR) hybrid automatic repeat request (IR-HARQ); or incremental freezing (IF) HARQ. IF-HARQ may use lower coding rates and/or increased mother codeword length. IF-HARQ for retransmission with joint encoding and transmission of failed data and/or control message(s) (e.g., new control message(s)) may be used. This may include one or more of the following: increased priority for retransmission data and mapping retransmitted data to more reliable bit channels; or allocating more PC frozen bits for retransmitted data. A (Continued)

HARQ decision may be provided. For example, a decision may be made between the use of chase combining (CC) HARQ, IR-HARQ, or IF-HARQ. For IF-HARQ, additional decisions may be made.

19 Claims, 15 Drawing Sheets

(52) U.S. Cl.
CPC .......... *H04L 1/0059* (2013.01); *H04L 1/0061* (2013.01); *H04L 1/0072* (2013.01)

(56) References Cited

U.S. PATENT DOCUMENTS

| | | | | |
|---|---|---|---|---|
| 2019/0109672 | A1* | 4/2019 | Kim | H04L 5/001 |
| 2019/0123860 | A1* | 4/2019 | Xu | H04L 1/00 |
| 2019/0207710 | A1* | 7/2019 | Ye | H04L 1/1819 |
| 2020/0052819 | A1* | 2/2020 | Xu | H04L 1/203 |
| 2020/0092048 | A1* | 3/2020 | Hong | H04L 1/1819 |
| 2020/0287659 | A1* | 9/2020 | Ye | H04L 1/0071 |

FOREIGN PATENT DOCUMENTS

| | | |
|---|---|---|
| CN | 106255215 A | 12/2016 |
| CN | 106301392 A | 1/2017 |
| EP | 3113398 A1 | 1/2017 |
| EP | 3113400 A1 | 1/2017 |
| WO | WO 2016192644 A1 | 12/2016 |
| WO | WO 2018-009572 A1 | 1/2018 |

OTHER PUBLICATIONS

Arikan, Erdal, "Channel Polarization: A Method for Constructing Capacity-Achieving Codes for Symmetric Binary-Input Memoryless Channels", IEEE Transactions on Information Theory, vol. 55, No. 7, Jul. 2009, pp. 3051-3073.
Niu et al., "Beyond Turbo Codes: Rate-Compatible Punctured Polar Codes", IEEE International Conference on Communications (ICC), Jun. 9-13, 2013.
Niu et al., "CRC-Aided Decoding of Polar Codes", IEEE Communications Letters, vol. 16, No. 10, Oct. 2012, pp. 1668-1671.
3rd Generation Partnership Project (3GPP), R1-1611254, "Details of the Polar Code Design", Huawei, HiSilicon, TSG RAN WG1 Meeting #87, Reno, USA, Nov. 10-14, 2016, 15 pages.
3rd Generation Partnership Project (3GPP), R1-1611255, "HARQ Scheme for Polar Codes", Huawei, HiSilicon, 3GPP TSG RAN WG1 Meeting #87, Reno, USA, Nov. 14-18, 2016, 25 pages.
Tal et al., "How to Construct Polar Codes", IEEE Transactions on Information Theory, vol. 59, No. 10, Oct. 2013, pp. 6562-6582.
Tal et al., "List Decoding of Polar Codes", arXiv:1206.0050v1, May 31, 2012, pp. 1-11.
3rd Generation Partnership Project (3GPP), TR 38.913 V0.3.0, "Technical Specification Group Radio Access Network, Study on Scenarios and Requirements for Next Generation Access Technologies (Release 14)", Mar. 2016, pp. 1-30.
Trifonov, Peter, "Efficient Design and Decoding of Polar Codes", IEEE Transactions on Communications, vol. 60, No. 11, Nov. 2012, pp. 3221-3227.
Vangala et al., "A Comparative Study of Polar Code Constructions for the AWGN Channel", arXiv:1501.02473v1, Jan. 11, 2015, pp. 1-9.
Wang et al., "A Novel Puncturing Scheme for Polar Codes", IEEE Communications Letters, vol. 18, Issue 12, Dec. 2014, pp. 2081-2084.
$3^{rd}$ Generation Partnership Project (3GPP), R1-17xxxxx, Chairman's notes, 3GPP TSG RAN WG1 Meeting #88, Athens, Greece, Feb. 13-17, 2017, 157 pages.
Rachid El Hattachi, et al., "NGMN 5G White Paper", NGMN Alliance, Feb. 17, 2015, 125 pages.
ITU-R, Radiocommunication Sector of ITU, "IMT Vision—Framework and overall objectives of the future development of IMT for 2020 and beyond", Sep. 2015, 21 pages.
Ganesan, et al., "Poster: A TDM approach for latency reduction of ultra-reliable low-latency data in 5G" IEEE Vehicular Networking Conference (VNC), Dec. 10, 2016, 2 pages.
Zhu, et al., "Energy-efficient and low-delay Reliable Data Gathering Scheme Applying Simple Reed-Solomon Code for Wireless Sensor Network" Jun. 2, 2015, 20 pages.

* cited by examiner

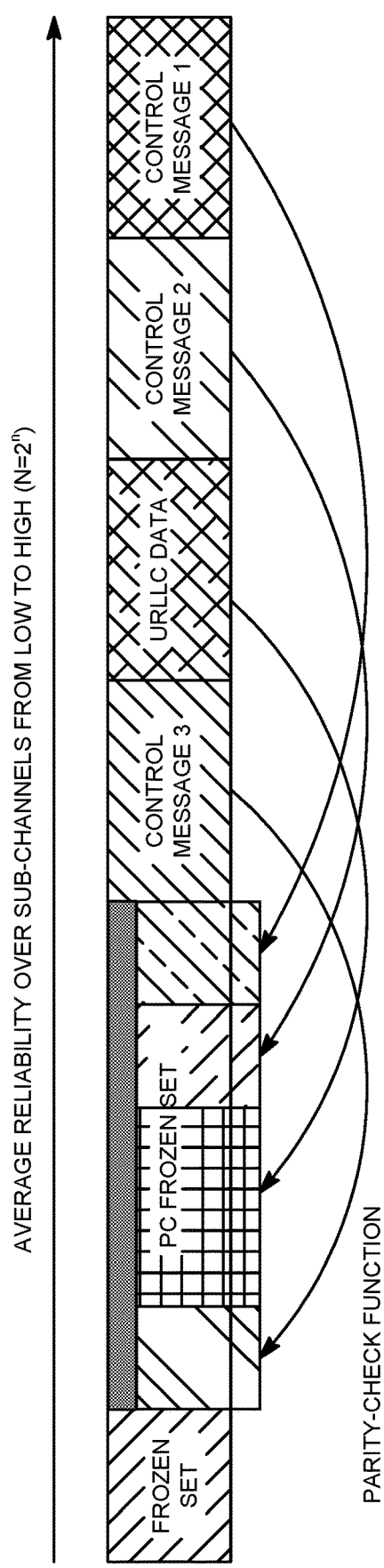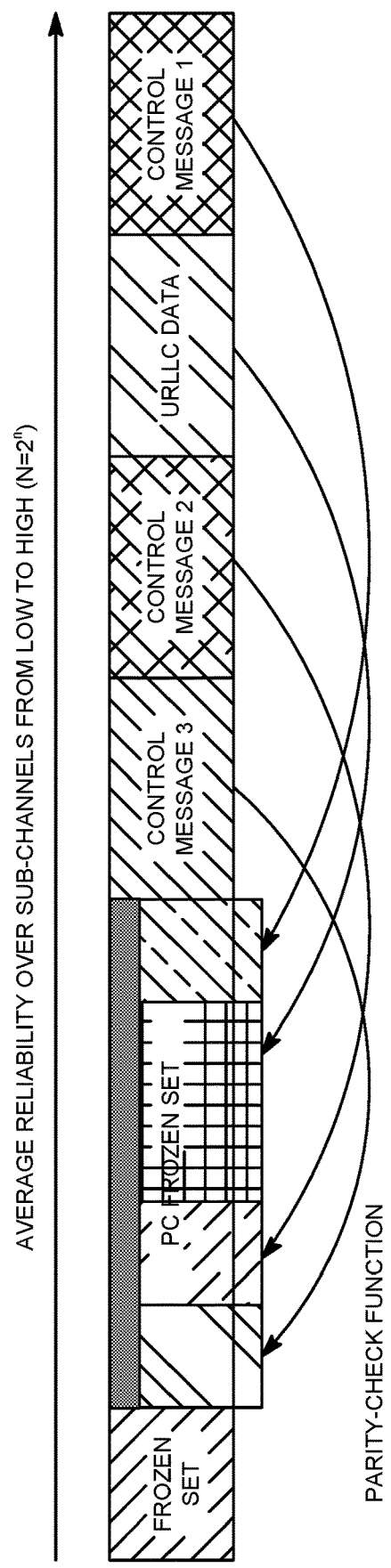

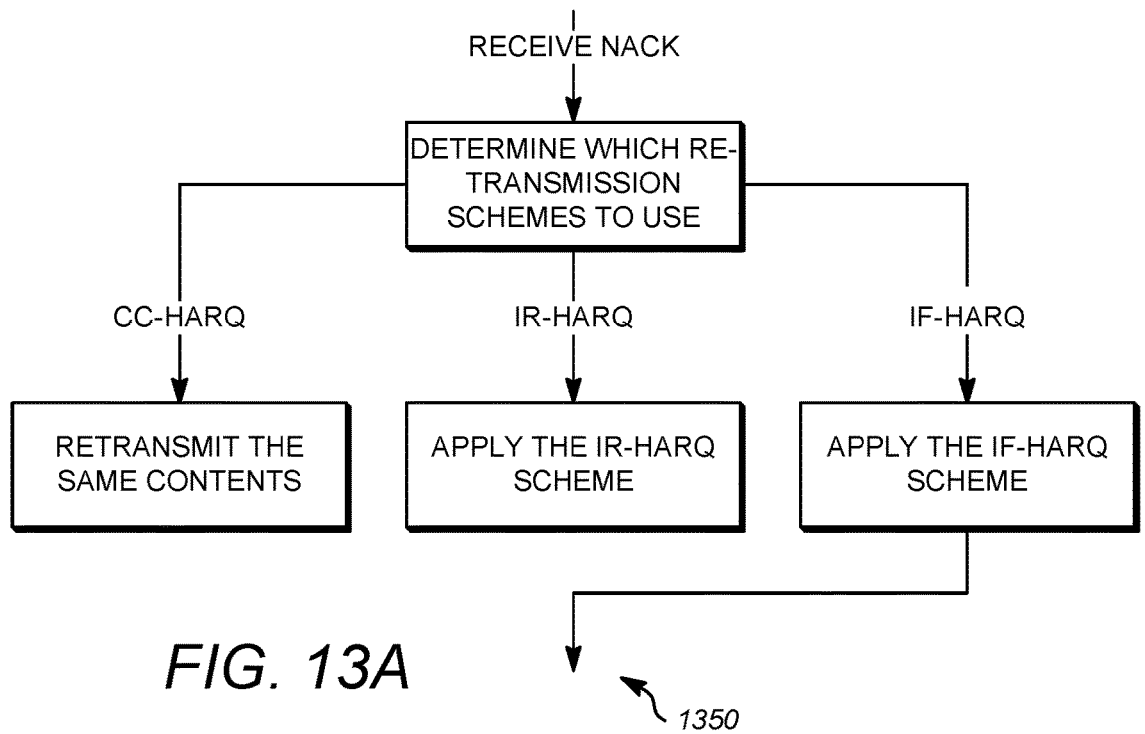
*FIG. 13A*
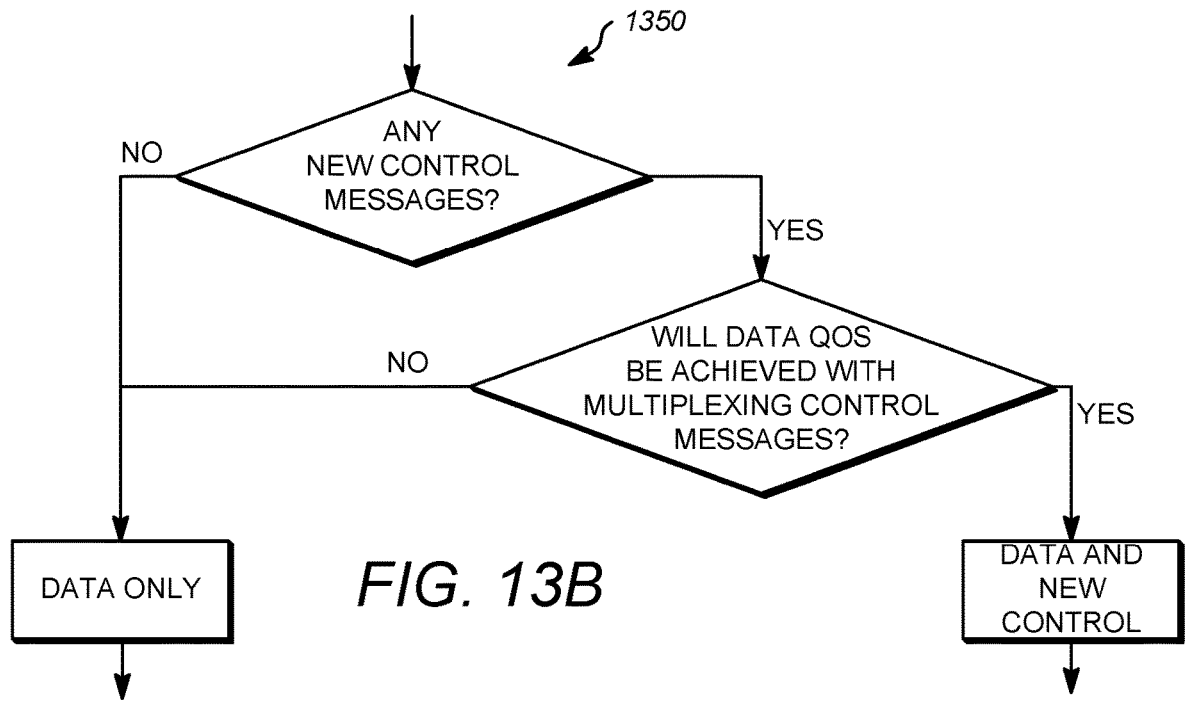
*FIG. 13B*
*FIG. 13*

ADVANCED CODING ON RETRANSMISSION OF DATA AND CONTROL

CROSS-REFERENCE TO RELATED APPLICATIONS

This application is the National Stage entry under 35 U.S.C. § 371 of Patent Cooperation Treaty Application PCT/US2018/012487, filed Jan. 5, 2018, which claims priority to and the benefit of U.S. Provisional Application Ser. No. 62/443,028, filed Jan. 6, 2017, which is hereby incorporated by reference herein.

BACKGROUND

In recent 3GPP standards discussions, several deployment scenarios have been identified, e.g., indoor hotsport, dense urban, rural, urban macro, high speed, etc.

Use cases may include one or more of the following: Enhanced Mobile Broadband (eMBB), Massive Machine Type Communications (mMTC) or Ultra Reliable and Low latency Communications (URLLC). Different use cases may focus on different goals, such as higher data rate, higher spectrum efficiency, low power and higher energy efficiency, and/or lower latency and higher reliability.

SUMMARY OF THE INVENTION

Systems, methods, and instrumentalities are disclosed for advanced coding on retransmission of data and/control information. The systems, methods, and instrumentalities may include one or more of the following: chase combining for retransmission; incremental redundancy (IR) hybrid automatic repeat request (IR-HARQ); or, incremental freezing (IF) HARQ. IF-HARQ may use lower coding rates and/or increased mother codeword length.

IF-HARQ for retransmission with joint encoding and transmission of failed data and/or control message(s) (e.g., new control message(s)) may be used. This may include one or more of the following: increased mother code length and/or decreased code rate; or, increased priority for retransmission data and mapping retransmitted data to more reliable bit channels; or, allocating more PC frozen bits for retransmitted data.

A HARQ decision may be provided. For example, a decision may be made between the use of chase combining (CC) HARQ, IR-HARQ, or IF-HARQ. For IF-HARQ, additional decisions may be made.

A device for communicating using ultra-reliable, low latency (URLLC) communication, may include a processor configured to receive a NACK associated with an ultra-reliable, low latency transmission, comprising control information and URLLC data. The device may be configured to determine whether a received NACK was sent with CC-HARQ, IR-HARQ, or IF-HARQ. If the received NACK was sent with CC_HARQ, the device may be configured to send a CC-HARQ retransmission. If the received NACK was sent with IF-HARQ, the processor may be configured to apply an IF-HARQ response. If the received NACK was IR-HARQ coded, the processor may be configured to send an IR-HARQ retransmission. The processor may be configured to determine whether to send the CC-HARQ or the IR-HARQ retransmission based on at least one device capability, a data QoS, and/or at least one available resource for retransmission.

The processor may be configured (e.g., if an IF HARQ NACK was received) to determine that (i) the URLLC data without control information needs to be retransmitted and to increase a mother code length of the URLLC data; or (ii) the URLLC data and the control information needs to be retransmitted. The processor may further be configured to generate a retransmission with the determined URLLC data to be transmitted without the control information with an increased mother code length or to generate a retransmission of the URLLC data and the control information to be transmitted with the URLLC data mapped to a first bit channel having a reliability that is greater than a bit channel used for the URLLC transmission. The processor may be configured to polar code the retransmission. The processor may be further configured to determine whether and how to use parity check frozen bits for retransmitting the URLLC data or the URLLC data and the control information. If the processor determines to use parity check frozen bits, the processor may be configured to apply parity check frozen bits to the transmission; and retransmit the retransmission with IF HARQ. The device may be a wireless transmit/receive unit or infrastructure equipment(s) of a wireless communication system.

The processor may be configured to encode the URLLC data or the URLLC data and the control information by code block segmentation, bit channel mapping, rate matching, multiplexing, and code block concatenation.

The processor may be configured to receive an ACK or NACK, for the retransmission that indicates whether a retransmission is needed.

The bit channel mapping may include assigning URLLC data to be retransmitted to a most reliable input bit subchannel of the polar codes to increase the priority of the URLLC data to be retransmitted.

The processor may be configured to generate the retransmission using a reduced coding rate relative to a coding rate used for the transmission and/or assign a higher priority to the URLLC data to be transmitted.

Communicating using ultra-reliable, low latency (URLLC) communication may include receiving a HARQ-NACK associated with an ultra-reliable, low latency (URLLC) transmission, the URLLC transmission comprising control information and URLLC data; determining that the HARQ-NACK was IF-HARQ coded; determining to retransmit (i) the URLLC data without control information or (ii) the URLLC data and the control information; generating a first retransmission comprising (i) the URLLC data polar coded with an increased mother code length if it was determined to retransmit the URLLC data without the URLCC control information; or (ii) the URLLC data and the control information polar coded, with the URLLC data mapped to a first bit channel having a reliability that is greater than a second bit channel, if it was determined to retransmit the URLLC data and the control information; determining whether to use parity check frozen bits for retransmitting the URLLC data or the URLLC data and the control information, and if it is determined to use parity check frozen bits, applying parity check frozen bits to the retransmission; and sending the first retransmission with IF HARQ.

Communicating using ultra-reliable, low latency (URLLC) communication may include receiving an ACK or NACK for the first retransmission that indicates whether a second retransmission should be sent and/or encoding the URLLC data or the URLLC data and the control information by code block segmentation, bit channel mapping, rate matching, multiplexing, and code block concatenation.

Generating the retransmission may include using a reduced coding rate relative to a coding rate used for the transmission.

Communicating using ultra-reliable, low latency (URLLC) communication may include determining whether the received HARQ-NACK was sent with CC-HARQ or IR-HARQ coding, and if the received HARQ-NACK was CC-HARQ coded, sending a CC-HARQ retransmission, and if the received HARQ-NACK IR-HARQ was coded, sending an IR-HARQ retransmission.

Communicating using ultra-reliable, low latency (URLLC) communication may include determining whether to send the CC-HARQ or the IR-HARQ retransmission based on at least one device capability, a data QoS, and/or at least one available resource for retransmission.

BRIEF DESCRIPTION OF THE DRAWINGS

A more detailed understanding may be had from the following description, given by way of example in conjunction with the accompanying drawings wherein:

FIG. 11 illustrates an exemplary bit sub-channel assignment for re-transmitted data using PC polar code (e.g., without changing priority of retransmission data).

FIG. 12 illustrates an exemplary bit sub-channel assignment for the re-transmitted data using PC polar code (e.g., changing priority of retransmission data).

DETAILED DESCRIPTION

Figure 1A:
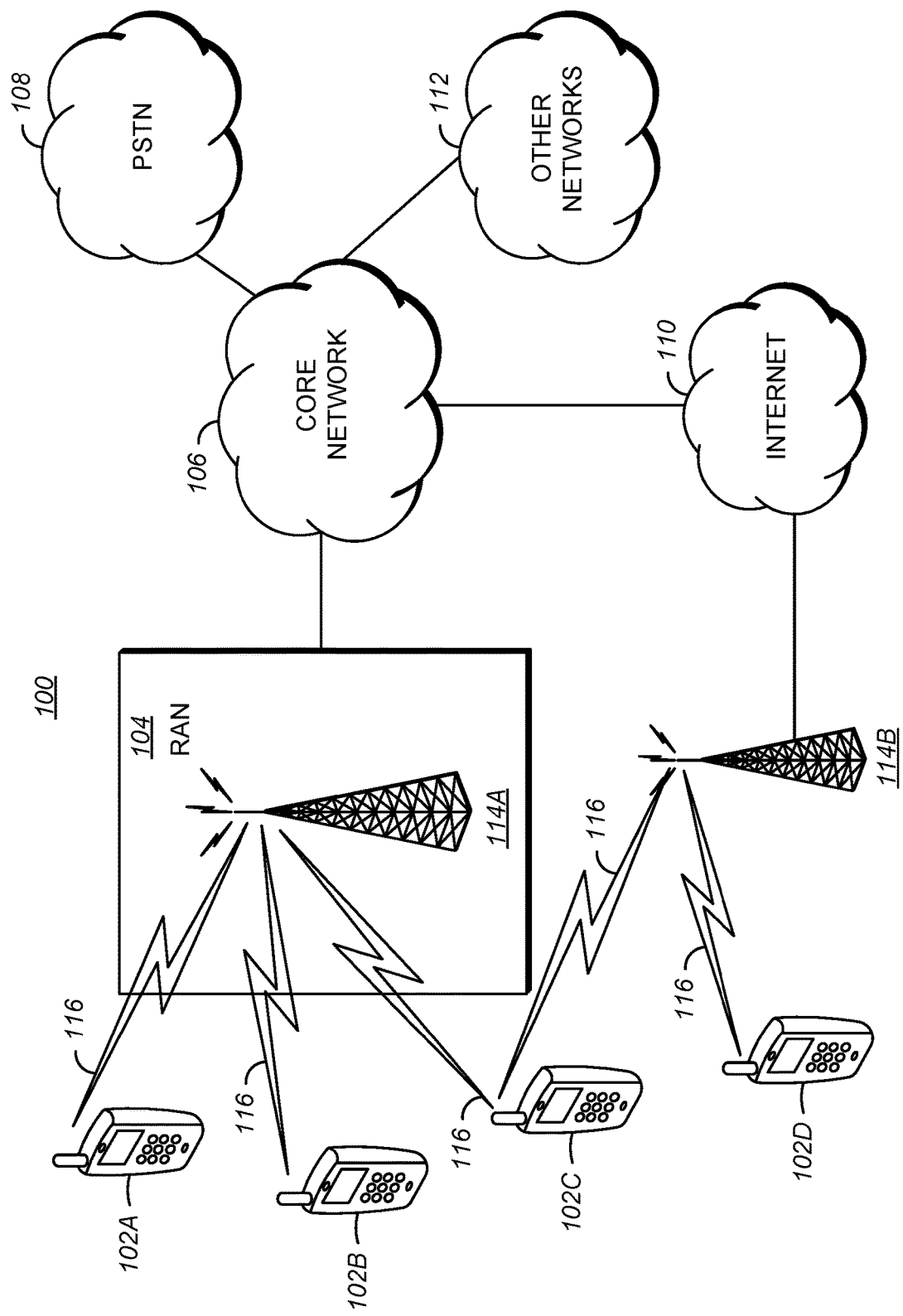
FIG. 1A is a system diagram illustrating an example communications system in which one or more disclosed examples may be implemented.

A detailed description of illustrative embodiments will now be described with reference to the various Figures. Although this description provides a detailed example of possible implementations, it should be noted that the details are intended to be exemplary and in no way limit the scope of the application. FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
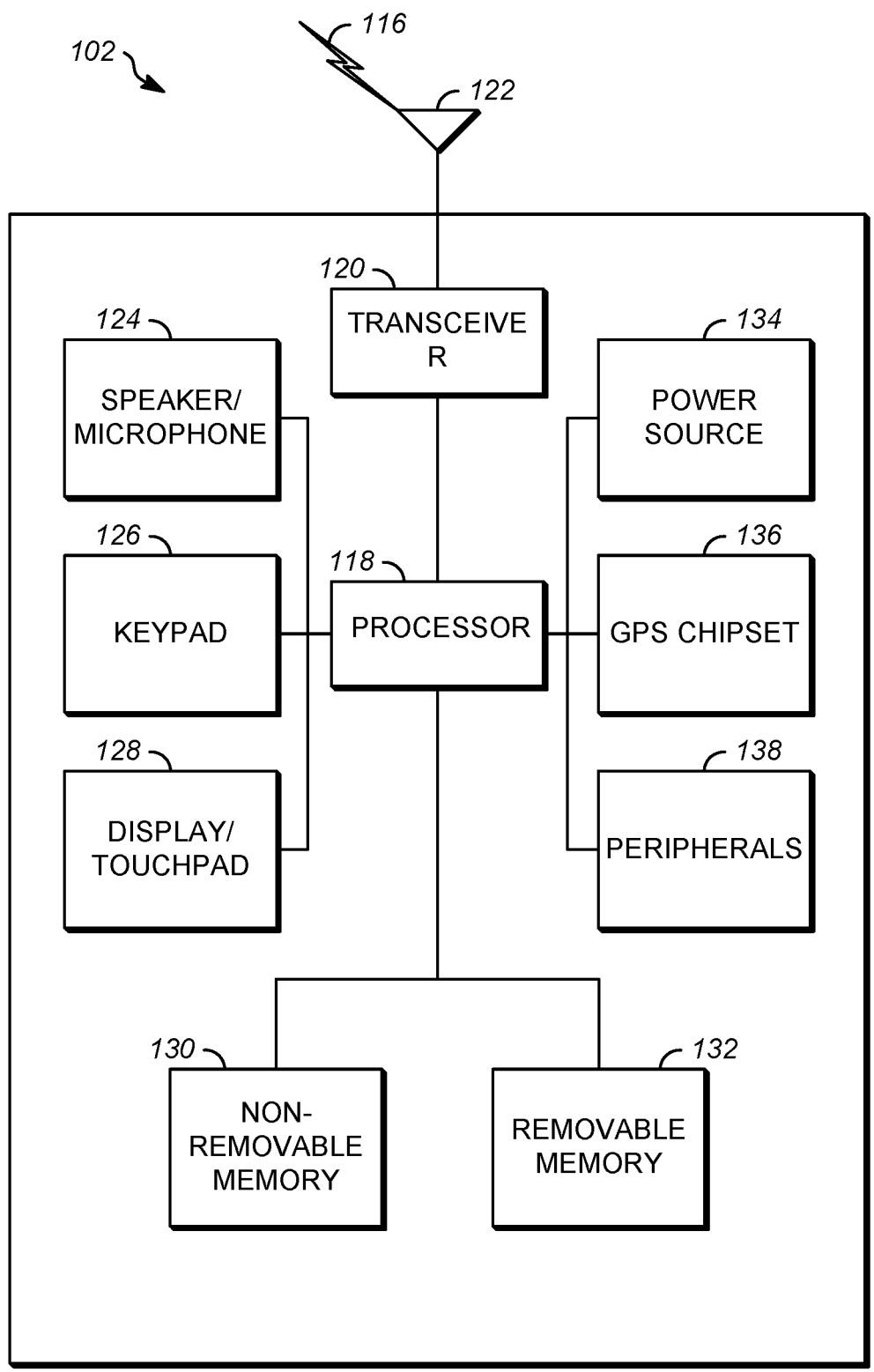
FIG. 1B is a system diagram illustrating an example wireless transmit/receive unit (WTRU) that may be used within the communications system illustrated in FIG. 1A according to an example.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
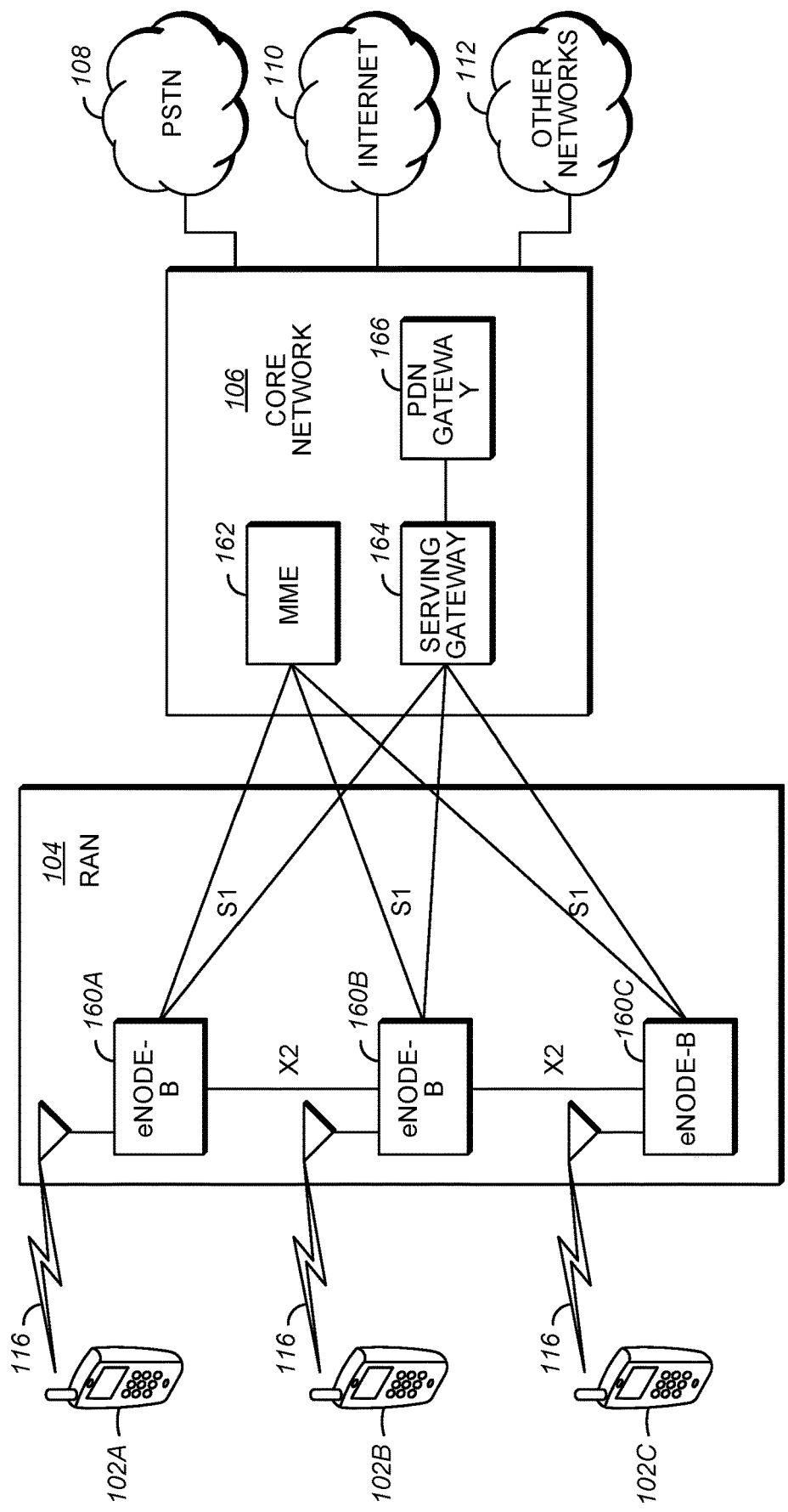
FIG. 1C is a system diagram illustrating an example radio access network (RAN) and an example core network (CN) that may be used within the communications system illustrated in FIG. 1A according to an example.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
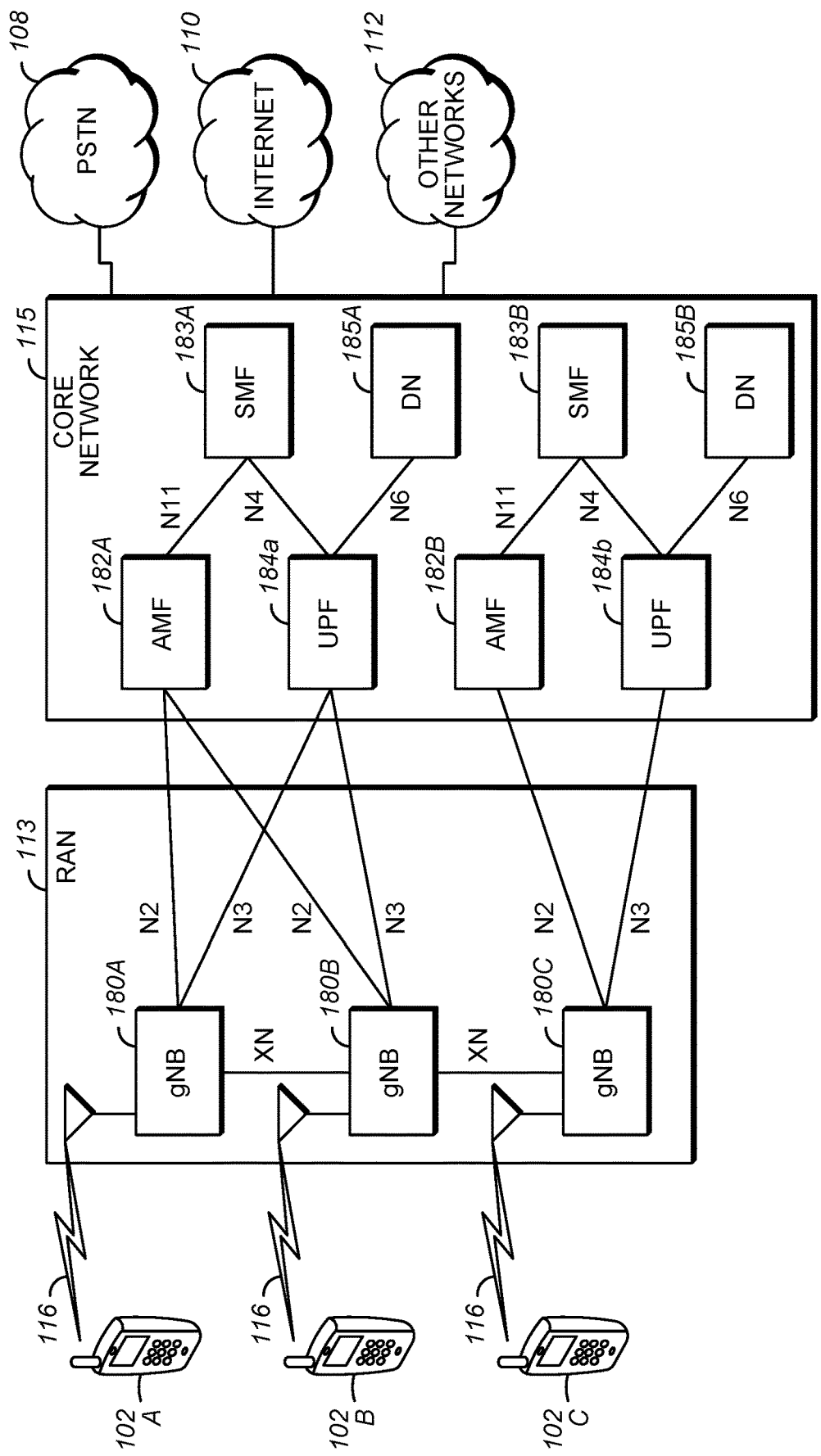
FIG. 1D is a system diagram illustrating a further example RAN and a further example CN that may be used within the communications system illustrated in FIG. 1A according to an example.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

Example applications of URLLC may include factory automation, remote tele-surgery, real time mobile control and vehicle-to-vehicle applications, etc. In URLLC, reliability of transmissions may be emphasized. For example, mean low error probability and/or low outage rate may be used for processing transmissions. A low latency may be another goal for URLLC, e.g., a target goal for user plane latency may be 0.5 ms for UL, and 0.5 ms for DL; and a target goal for reliability may be $10^{-5}$ within 1 ms.

Turbo codes, LDPC codes, and polar codes may be capacity achieving codes. Polar codes may be linear block codes, with low encoding and decoding complexity, a very low error floor, and explicit construction schemes.

Consider a (N, K) polar code, where K is the information block length and N is coded block length. Here, the value N is set as a power of 2, e.g., $N=2^n$ for some integer n. The generator matrix of a polar code can be expressed by $G_N = B_N F^{\otimes n}$, where $B_N$ is the bit-reversal permutation matrix, $(.)^{\otimes n}$ denotes the n-th Kronecker power and $$F = \begin{bmatrix} 1 & 0 \\ 1 & 1 \end{bmatrix}.$$

Figure 2:
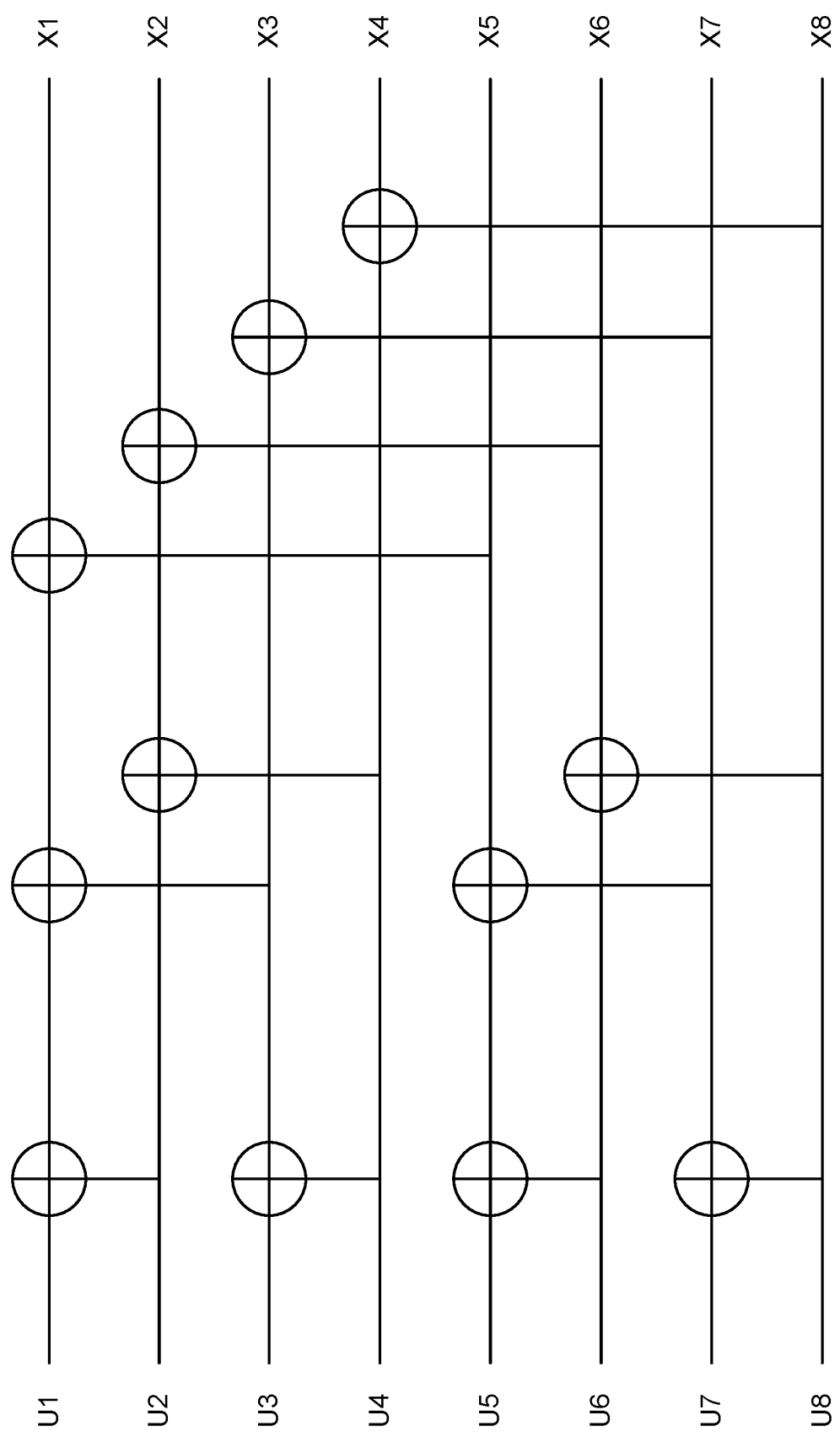
FIG. 2 shows an example polar encoder with N=8.

In some polar code implementations, the $B_N$ may be ignored at the encoder side for simplicity and the bit-reversal operation is done at the decoder side. FIG. 2. shows an example polar encoder with N=8, and an example implementation of $F^{\otimes 3}$. The outputs of polar encoder are given by $x^N = u^N G_N$.

A Successive Cancellation (SC) decoding scheme may be used with polar codes. Some advanced decoding schemes may be based on SC decoding, e.g., Successive Cancellation List (SCL) decoding and CRC-Aided SCL decoding.

Polar codes may be well structured in terms of encoding and decoding. The design of a good polar code may rely on the mapping of the K information bits to the N input bits $u^N$ to polar encoder. The K information bits may be put on the K best bit channels (or the most reliable bit channels, etc.). The remaining N−K input bits, not mapped from the information bits, may be referred to as frozen bits, which may be set as 0. The set of the positions for frozen bits may be referred to as frozen set $\mathcal{F}$.

There may be multiple ways to calculate the reliability of a bit channel. Examples may include one or more of the following: the Bhattacharyya bounds, the Monte-Carlo estimation, the full transition probability matrices estimation, or the Gaussian approximation. These may have different computation complexity and may apply to different channel conditions.

As illustrated in FIG. 2, the output of polar encoder has a power of 2 bits. This imposes the restriction of polar codes. For example, the length of information bits (K) and the coding rate (R) are pre-determined. This may imply that the coded block length is determined as $$\frac{K}{R}.$$

This number may not always be a power of 2. The puncturing of polar encoder output bits may be executed. A way to encode K information bits at coding rate R is to first find the smallest power of 2, which is larger than $$\frac{K}{R}.$$

Then puncturing from that number to $$\frac{K}{R}.$$

For instance, given K=100 bits and R=⅓, it can be calculated that the coded block length is 300 bits. Here, we could use a (512, 100) polar code, followed by puncturing 212 bits from the outputs of the polar encoder.

Several puncturing schemes for polar codes may be used. The quasi-uniform puncturing scheme and the weight-1 column reduction scheme are two puncturing schemes. Unlike turbo codes or LDPC codes, the puncturing schemes of polar codes may be related to code construction. Depending on which bits to be punctured from the output of polar encoder, the frozen bits set may need to be adjusted accordingly.

Polar codes may be used for channel coding for an eMBB control channel (e.g., may be used for one or more of the UL control channel or DL control channel.

Figure 3:
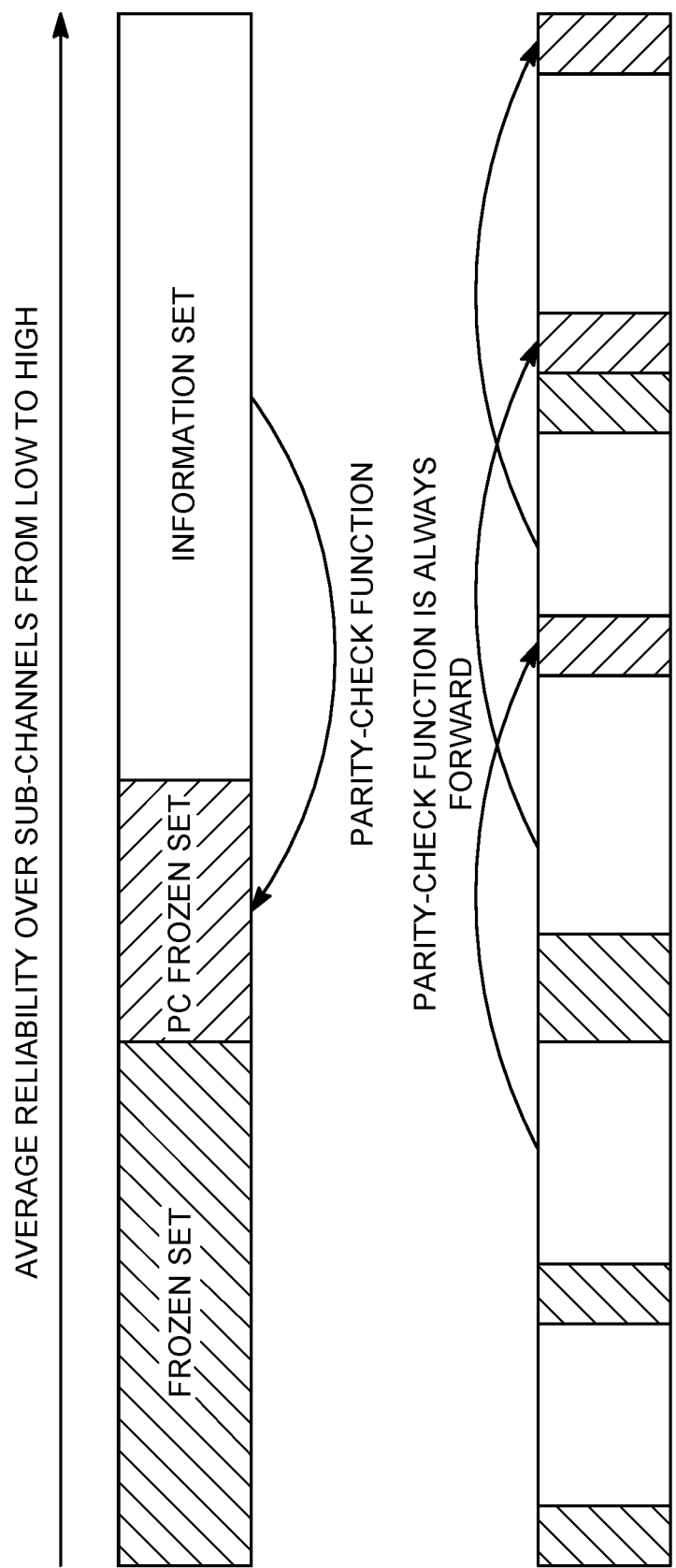
FIG. 3 shows an exemplary PC polar code.

Parity Check (PC) polar code may be used. A difference between PC-polar code and the regular polar code may be that a subset of the frozen sub-channel set is selected as PC-frozen sub-channels. Over these sub-channels, a PC function may be established for error correction. At each parity check sub-channel position, the decoded bits involved into the PC function over this PC-frozen sub-channel would help prune the list decoding tree, e.g., only the paths that meets the PC-function would survive, the rest may be eliminated, e.g., on the fly. The PC function may need to be established as forward-only to be consistent with any successive cancellation-based decoder. FIG. 3 shows the exemplary PC polar code.

Joint Transmissions of Data and Control may be provided for channel coding. The prioritized data and control channel encoding using polar codes may be used. For example, higher priority URLLC data information may be multilplexed with control information. The multiplexed data and control bits may be assigned to different bit channels of a polar code. The assignment may be to allocate more reliable bit channels for higher priority URLLC data, and allocate (e.g., relatively) less reliable bit channels for lower priority control information. Similar operations may apply for higher priority control information over lower priority regular data information.

Although the priority-based polar encoding may be applied for the joint transmissions of data information and control information as discussed, the case of transmission failure may need to be considered. The retransmission of failed data may be needed in a communication system, though the retransmission of control information may not be needed. For the case of joint transmission of control information and data information, if the transmitted data is not able to be decoded at the receiver side, then the re-transmission may be required. Such retransmission may relate to URLLC data due to its target BLER level of $10^{-5}$. Data retransmissions for the case of joint transmissions of data and control information is described herein.

Figure 4:
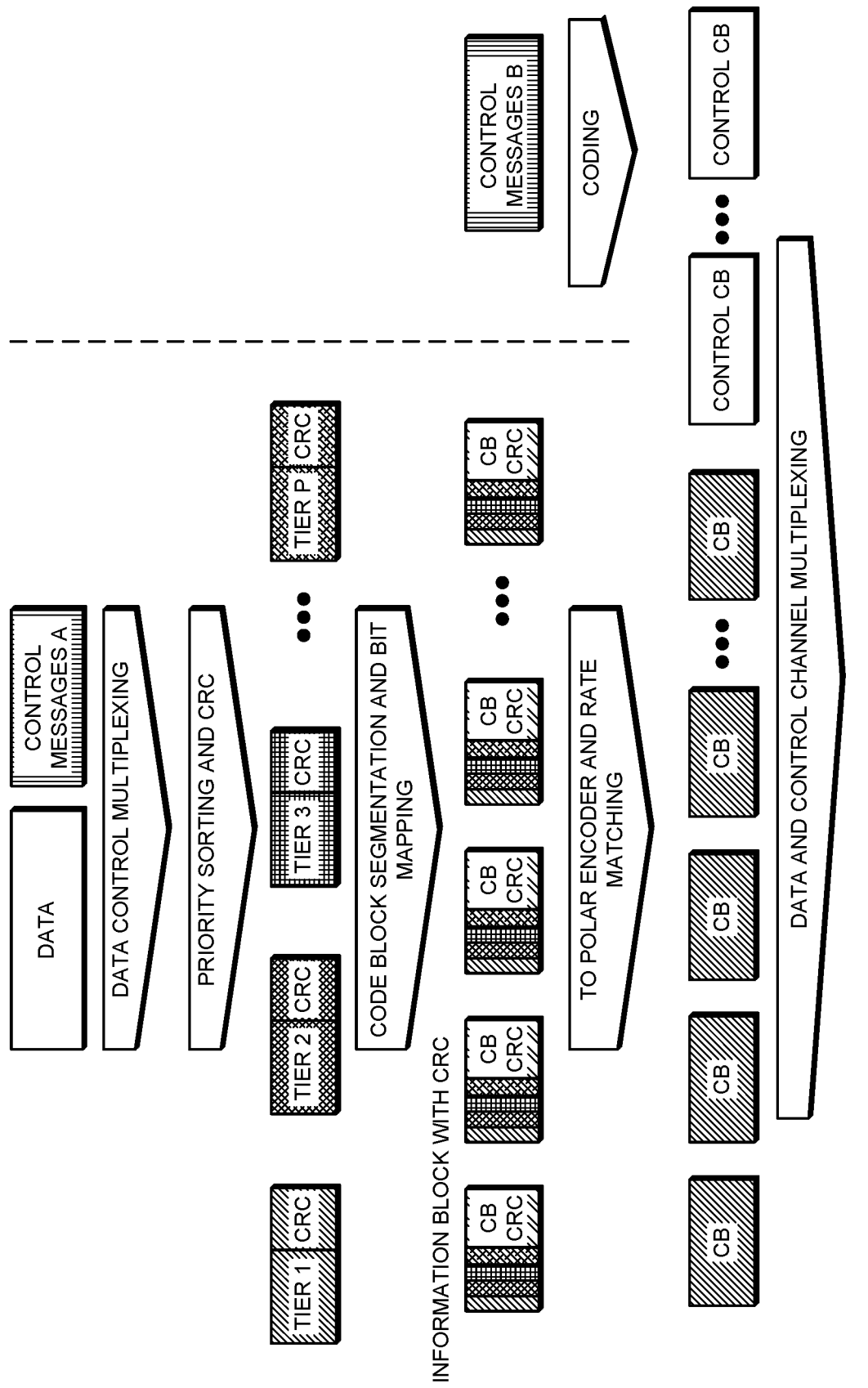
FIG. 4 illustrates an example using polar coding, e.g., for generalized message prioritization.

In one or more examples, a first transmission may use joint data and control polar encoding and transmission, e.g., the exemplary prioritization processing architecture may be shown in FIG. 4. FIG. 4 shows an example of multilplexing and coding that can be programmed into one or more computer processors, such as a WTRU or a wireless communication system infrastructure equipment. The data and control messages may be multiplexed into a common data frame (e.g., as shown in FIG. 4). Prior to code block segmenation, messages may be placed in priority tiers, and CRC may be computed for one or more tiers. The data and control prioritization may be performed according to a pre-defined message priority to allow the receiver to identify relevant messages.

Different control information may have different priorities. The control information could be L1/L2 control, higher layer control, and/or other control information. The processor may be programmed to apply priorities and sort the data and control information according to the priorities (e.g., as shown in FIG. 4).

The L1/L2 control information may include one or more of the following: (e.g., wideband or subband) Channel Quality Indicator (CQI), Precoding Matrix Indicator (PMI), Rank Indicator (RI), HARQ-ACK/NACK, Beam Indentificator (Beam ID), CSI-RS Resource Indicator (CRI), Precoder type indicator (PTI), etc.

The higher layer control information may include one or more of the following: RRC connection request, RRC connection setup, RRC connection reconfiguration, RRC connection resume, etc.

The control information may be associated with use cases, e.g., eMBB control information, URLLC control information, mMTC control information. The control information priorities may rely on the use cases. For example, the URLLC control information may have higher priority than mMTC control information.

The data information may be prioritized by its QoS and/or data types (e.g., eMBB data, URLLC data, mMTC data). It may depend on whether this data is for the first transmission, or second transmission, or third transmission, etc.

FIG. 4 illustrates an example using polar coding, e.g., for generalized message prioritization. A processor may be programmed to apply the polar coding and rate matching. The processor may generate data code blocks and control code blocks as for example is shown in FIG. 4.

Figure 5:
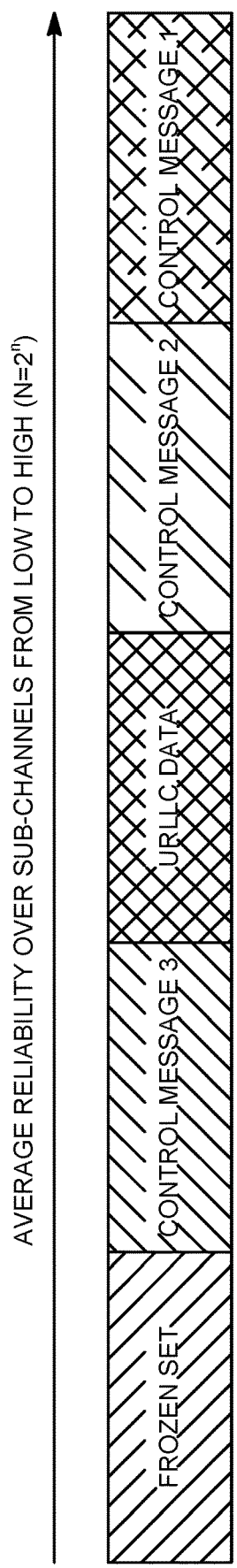
FIG. 5 illustrates exemplary bit sub-channel assignment for the first transmitted data.

Each input bit sub-channel for a polar encoder may be associated with a reliability value. If we arrange these sub-channels in the order of increasing reliabilities, then we may put higher priority information to the later positions of the list, while putting lower priority information to the beginning positions of the list. FIG. 5 illustrates an example, e.g., exemplary bit sub-channel assignment for the first transmitted data. In the figure, the control message 1 has the highest priority, control message 2 has the second highest priority, URLLC data has the third highest priority, control message 3 has the fourth highest priority.

Chase Combining for retransmission may be provided. Chase Combining (CC) retransmission may refer to a re-transmission where the same coded block from the last transmission is retransmitted. The receiver may combine the signals received from the first transmission and retransmission(s) before passing them to the decoder. The CC type of retransmission may be manageable for both transmitter and receiver in terms of storage memory and decoding complexity, but it may not result in good BLER performance.

In the case of jointly encoding control and data information, both data and control messages in the first transmission may be re-sent and may be re-decoded jointly at the receiver (e.g., a processor programmed to receive and decode the messages). The retransmission of control messages may not be needed in general; it could be a waste of resources by re-transmitting these control messages.

Incremental Redundancy (IR) for retransmissions may be provided. IR-HARQ for polar codes may be used. IR-HARQ retransmission may have better BLER performance than a CC-HARQ retransmission scheme, which may be at the cost of more storage memory and larger decoding complexity.

In the case of jointly encoding control and data information, the redundancy version of the multiplexed data and control messages may be transmitted. The receiver (e.g., a processor programmed to receive and decode the messages) may apply different a redundancy version and try to decode the control message and data simultaneously. The retransmission of control messages may not be needed, e.g., in general; it may be a waste of resources by transmitting the multiple redundancy version of the multiplexed data and control messages.

Incremental freezing types of retransmission may be provided. Besides CC type of HARQ, a HARQ system for polar code may be referred to as incremental freezing (IF) HARQ. In the IF-HARQ, partial information bits (e.g., only partial information bits) from the first transmission may be re-encoded for re-transmission. The receiver may (e.g., first) decode the subset of the raw information block from the re-transmissions. The receiver may try (e.g., second) to decode the remaining bits of raw information block, e.g., by replacing the decoded subset of the raw information block from the later re-transmissions.

The IF-HARQ scheme may be applied to the case of joint encoding and transmission of control and data messages. In the case of jointly encoding and transmitting control and data, the IF-HARQ scheme used here may be limited to the transmitter side. The receiver side may not try to use the successfully decoded bits in the retransmissions to further decode the information (e.g., all the information) in the first transmission. This may be because it may not be needed to decode the failure control messages in the first transmission. This may differ from the regular IF-HARQ scheme used for the case where data and not control (e.g., only data) is encoded by polar code.

There may be several ways of applying the IF-HARQ scheme.

Retransmissions limited to data may be provided. In the re-transmissions for the failure data, data (e.g., only data) may be encoded and re-transmitted. For example, no control messages are multiplexed with the data before polar encoding. Polar encoding may follow the data encoding process, e.g., as in FIG. 6.

Figure 6:
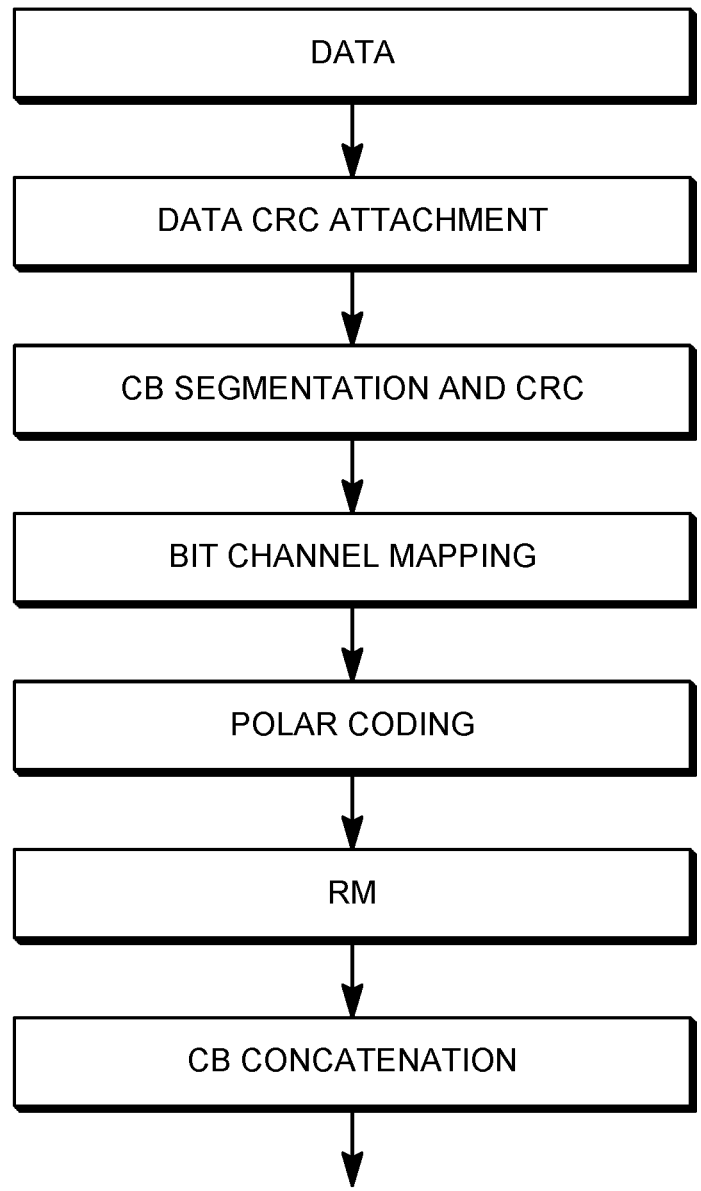
FIG. 6 illustrates an exemplary data encoding process.

In the bit channel mapping block of FIG. 6, the URLLC data to be retransmitted may be assigned to the most reliable input bit sub-channels of polar code. In these retransmissions, the coding rate of the URLLC data may be reduced from the first transmission, e.g., as in FIG. 4.

Suppose in the first transmissions, the control message $C_i$, $1 \leq i \leq l_c$, is of size $|C_i|$, and the data message D is of size $|D|$. Since the control messages and data message are multiplexed before polar encoder, the effective coding rate (e.g., before rate matching) is $$\frac{D + \sum_{i=1}^{l_c} C_i}{N},$$

where $N=2^n$ is the mother codeword block size of polar code. This coding rate is reduced to $$\frac{D}{N}$$

in the re-transmission. This additional redundancy introduced in the re-transmission may help decode the data message, e.g., without doing any combinations of the signals from the first transmission and the re-transmission.

In this case, the mother polar codeword length may be increased for the retransmission which may further reduce the effective coding rate of the re-transmitted data. This may enhance the reliability of the re-transmission to achieve the required data QoS.

Figure 7:
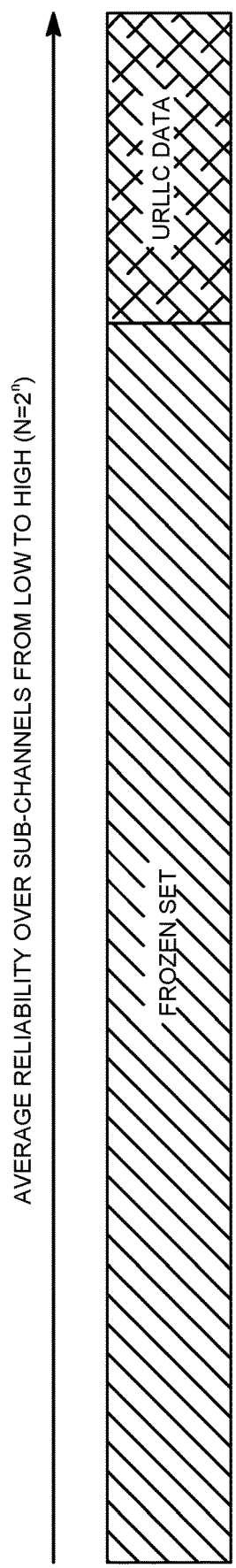
FIG. 7 illustrates an exemplary bit sub-channel assignment for re-transmitted data (e.g., data-only).
Figure 8:
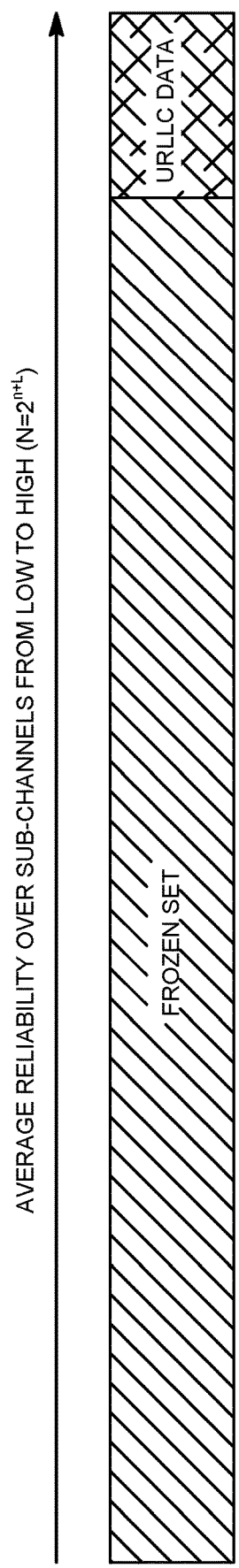
FIG. 8 illustrates an exemplary bit sub-channel assignment for re-transmitted data with increased mother codeword length (e.g., data-only).

FIG. 7 may illustrate exemplary bit sub-channel assignment for the re-transmitted data (e.g., data-only). FIG. 8 may illustrate exemplary bit sub-channel assignment for the re-transmitted data with increased mother codeword length (e.g., data-only).

Figure 9:
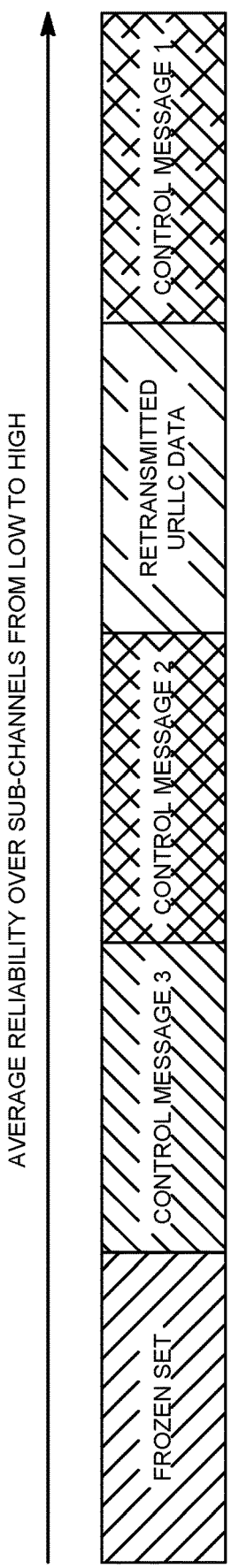
FIG. 9 illustrates exemplary bit sub-channel assignment for re-transmitted data (e.g., mapping retransmitted data to more reliable bit sub-channels).

For joint data and control in retransmissions retransmitted data may be mapped to more reliable bit sub-channels. In the re-transmission of failure data, the data may be jointly encoded with some control information (e.g., new control information). The encoding process may be similar to the first transmission; the priority of the retransmission data may be increased. FIG. 9 illustrates exemplary bit sub-channel assignment for the re-transmitted data (e.g., mapping retransmitted data to more reliable bit sub-channels). FIG. 9 shows an example of listing control messages and data in terms of increasing reliabilities for re-transmissions. Comparing with FIG. 5, the URLLC data to be retransmitted has a higher priority than control message 2 in the re-transmission (e.g., the transmitted URLLC data is later in the data channel in the FIG. 9 example than in the FIG. 5 example).

Figure 10:
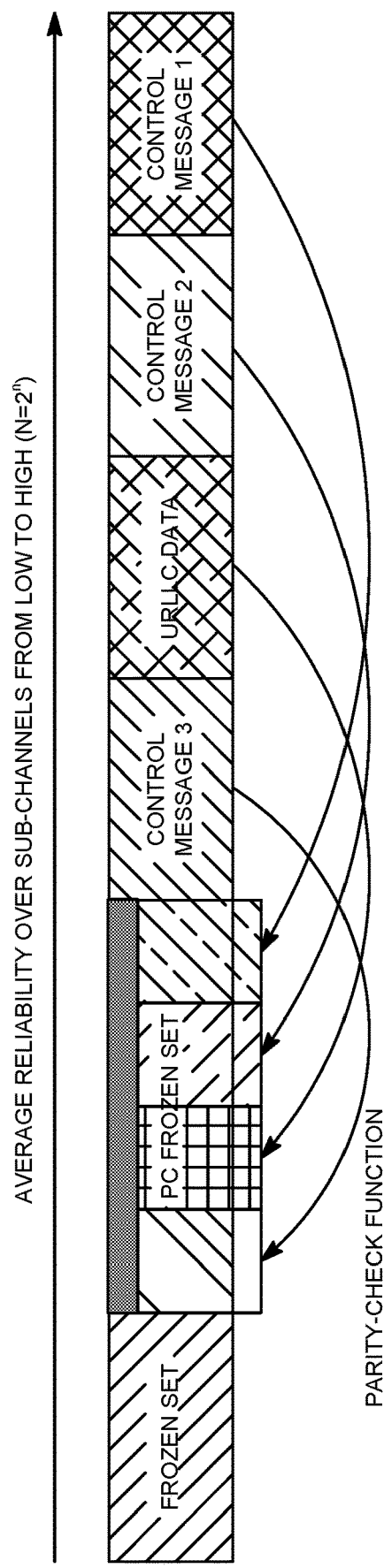
FIG. 10 illustrates an exemplary bit sub-channel assignment for a first transmitted data using PC polar code.

For joint data and control in retransmissions, PC frozen bit sets may be allocated for retransmitted data. In the above discussions, the polar codes may be applied without parity bits. The proposals in the above discussions may apply to PC polar codes. FIG. 10 illustrates exemplary bit sub-channel assignment for the first transmitted data using PC polar code. FIG. 10 shows an example of listing control messages and data in the terms of increasing reliabilities in the first transmissions using PC polar codes. Comparing with FIG. 5, the PC frozen set is partitioned by several areas, e.g., each corresponding to a certain control message or data.

In the re-transmission of failure data, the data may be jointly encoded with some control information (e.g., new control information). The encoding process may be similar to the first transmission, e.g., without changing the priority of the retransmission data. The number of bit sub-channels in the PC frozen set may be increased for the retransmission data. This update allows for more error detection protection of the retransmitted data. This is shown in FIG. 11. FIG. 11 illustrates exemplary bit sub-channel assignment for the re-transmitted data using PC polar code (e.g., without changing priority of retransmission data).

In joint data and control in retransmissions, more reliable bit channels and more PC frozen bit set for retransmitted data may be provided. The coding may be combined for PC polar codes. The priority of the retransmission data may be increased and the number of bit sub-channels in the PC frozen bit set for the retransmission data may be increased. An example is illustrated in FIG. 12. FIG. 12 illustrates exemplary bit sub-channel assignment for the re-transmitted data using PC polar code (e.g., changing priority of retransmission data with the URLLC data having a higher priority than in FIG. 11).

Retransmission determination and signaling may be used for example when the transmission cannot be decoded. Several HARQ coding systems have been described. A processor may be programmed (e.g., upon receipt of a NACK) to determine which HARQ system to use when the first transmission has joint data and control encoding.

A receiving entity (e.g., a device or system with a programmed processor) may determine to send a retransmission (e.g., ACK/NACK-based). Receiver-based retransmission systems may be used. The receiver (e.g., a programmed processor) may attempt to decode the payload (e.g., multiplexing of data and control information). In case of decoding error, the receiver (e.g., a programmed processor) may have some clues regarding how far the current decoding is from a successful decoding. For example, if PC polar codes are used, a programmed processor uses the PC frozen set to detect the errors of an information set. For example, the more parity checks that are passed, the closer is decoding success. Based on this information, the receiver (e.g., a programmed processor) may know how far it is before decoding success is achieved. Using this information, the receiver (e.g., a programmed processor) may determine the retransmission for the next transmissions. This decision may be used by the transmitter (e.g., a device or system with a programmed processor, which can be incorporated with the receiver or separate from the receiver) in terms of the NACK contents.

The ACK/NACK feedback may not be restricted to 1 bit information; there may be several levels of NACK. For example, a first type of NACK may trigger the Chase combining retransmission scheme, a second type of NACK may trigger the IR-HARQ retransmission scheme, a third type of NACK may trigger the IF-HARQ transmission scheme with data-only in retransmission, a fourth type of NACK may trigger the IF-HARQ transmission scheme with multiplexed data and control information (e.g., new control information), where retransmitted data may have higher priority; a fifth type of NACK may trigger the IF-HARQ transmission scheme with multiplexed data and control information (e.g., new control information), where retransmitted data may have more allocated PC frozen bits; a sixth type of NACK may trigger the IF-HARQ transmission scheme with multiplexed data and control information (e.g., new control information), where retransmitted data may have higher priority and more allocated PC frozen bits. A processor may be configured to receive the NACK and determine the type of HARQ that has been indicated. For example, a processor can be configured to determine which type of NACK was indicated by using an ACK/NACK index (e.g., below) and comparing the NACK message with the ACK/NACK index to determine the indicated ACK/NACK.

An exemplary ACK/NACK index and contents is listed in Table 1. Feedback from receiver to transmitter may be limited to the the ACK/NACK index.

TABLE 1

Exemplary ACK/NACK types and contents

| ACK/NACK index | Types | Additional Contents |
| --- | --- | --- |
| 0 | ACK | |
| 1 | NACK with CC | |
| 2 | NACK with IR | |
| 3 | NACK with IF | Data only |
| 4 | NACK with IF | Multiplex data and new control, with increased data priority |
| 5 | NACK with IF | Multiplex data and new control, with more PC frozen bits for data |
| 6 | NACK with IF | Multiplex data and new control, with both more PC frozen bits for data and increased data priority |

Figure 13C:
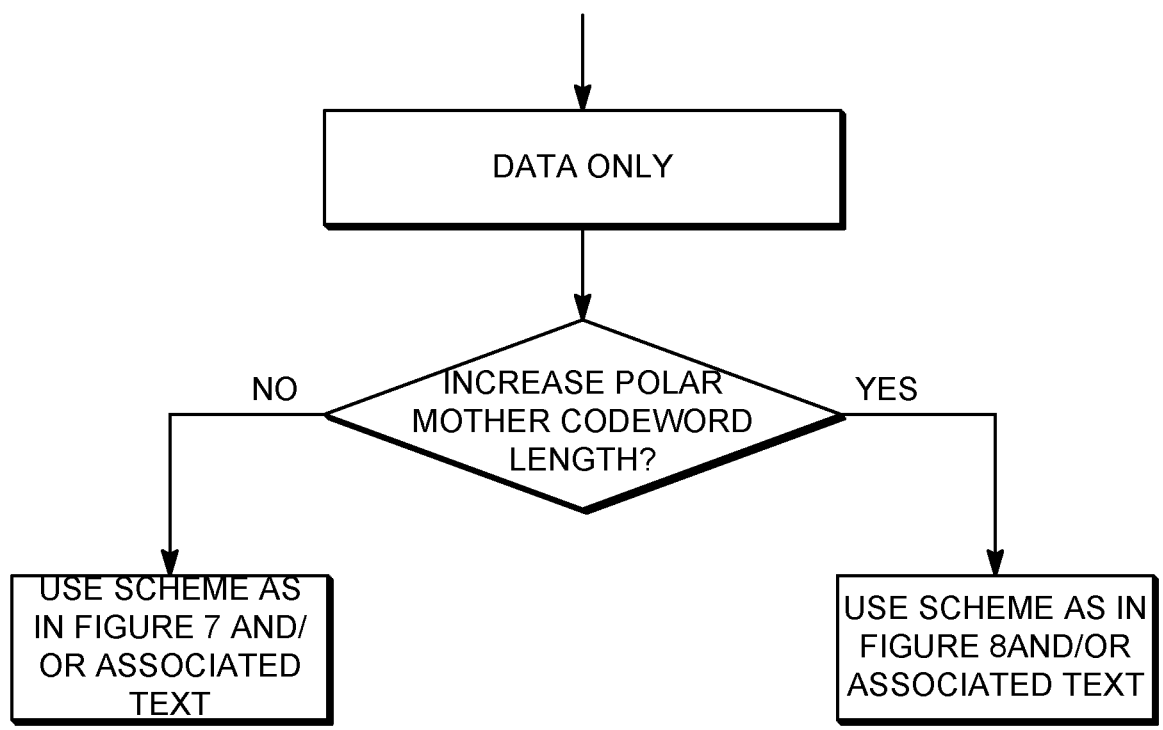
FIG. 13 (FIGS. 13A-13D) provides an exemplary HARQ decision.
Figure 13D:
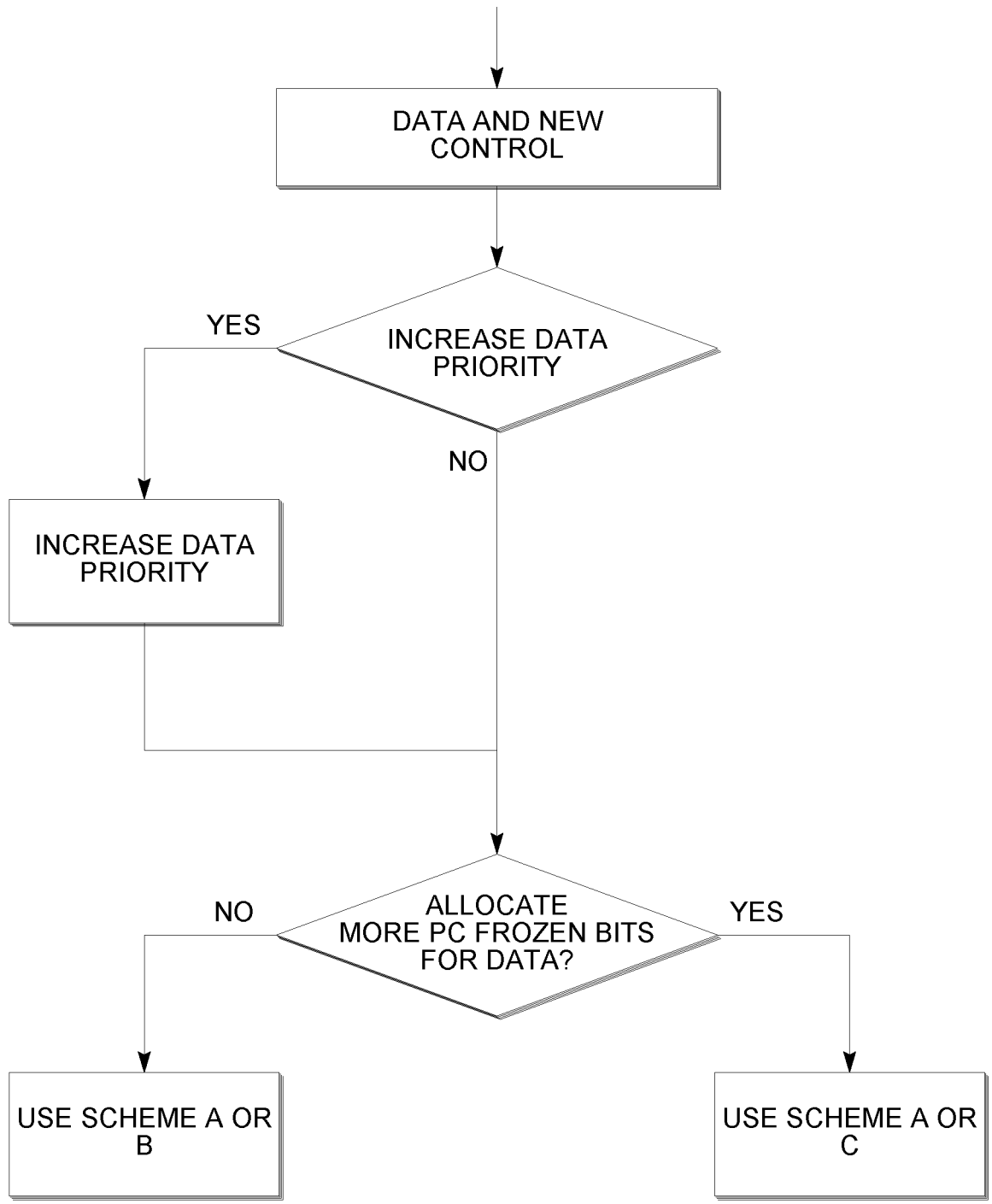

The retransmission scheme may be dynamically determined by the transmitter. FIG. 13 (FIGS. 13A-13D) provides an exemplary HARQ decision, e.g., outcome may be the HARQ schemes described above. The exemplary HARQ scheme decision may include one or more of the following features, e.g., as illustrated in FIG. 13.

If the transmitter receives a NACK for a transmission which jointly encodes data and control information, it may decide (e.g., at 104) as shown in FIG. 13A) which HARQ type to apply for the retransmission, e.g., CC-HARQ, IR-HARQ or IF-HARQ. The decision may depend on one or more of the following: transmitter and/or receiver capabilities, which may imply the encoding and decoding latency; data QoS, which may include latency and/or reliability requirements; or available resources (e.g., resource blocks) for retransmissions. One or more of the following examples may apply.

If data (e.g., data associated with the transmission) has tight latency requirement (e.g., a requirement that is above a threshold or a priority that is higher than other parameters considered, etc.) and is associated with a relaxed reliability requirement (e.g., the relaxed reliability requirement is below a threshold or has a priority lower than other parameters considered, etc.), then the CC-HARQ scheme may be used, e.g., as no additional channel encoding is needed, and the channel decoding is straightforward, at the cost of not so well BLER performance. The CC-HARQ scheme may have little reliance on the transmitter and receiver's capabilities.

If data has a tight reliability requirement and relaxed latency requirement, and the transmitter and receiver have strong computational capabilities, then the IR-HARQ scheme may be applied, e.g., to make use of its good BLER advantages.

If the number of resources for re-transmission is restricted and the data QoS requirement is high, then an IF-HARQ scheme may be used. This may be because the re-transmission does not encode the unnecessary control messages in the first transmissions.

If CC-HARQ is determined, the features discussed herein for chase combining for retransmission may be used. If IR-HARQ is determined, the features discussed herein for Incremental Redundancy (IR) for retransmissions may be used. If IF-HARQ is determined, the features discussed herein for incremental freezing types of retransmission may be used. In this case, some further sub-scheme may need to be further determined, e.g., as shown in FIG. 13, e.g., 1350.

In the case of IF-HARQ, the next decision is about whether or not to encode the retransmission data with some control message(s) (e.g., new control messages). This decision may depend on: whether there is any new control message(s) to send; and/or whether the data QoS requirement can be achieved with the joint encoding of the retransmission data and the new control message(s). If the answers to both questions are NO, then the failure data (e.g., only the failure data) may be encoded for the retransmission. Depending on the data QoS requirement and available resources for data retransmission, the transmitter may decide whether or not to increase the polar mother codeword lengths. For example, if the data reliability requirement is high and the available resources for data retransmission is not restricted, then the polar mother codeword length may be increased from the previous transmission. Otherwise, it may be kept the same as the previous transmission. Based on this decision, one or more of the schemes described herein for retransmissions that are limited to data may be applied. If the answers to either of the above two questions is YES, then the failure data may be jointly encoded with control information (e.g., new control information). In this case, depending on data QoS requirements, the transmitter may decide whether or not to increase the priority level of the failure data and/or whether or not to allocate more PC frozen bits for the failure data. If the transmitter does not decide to allocate more PC frozen bits for the failure data, the corresponding HARQ schemes may include one or more of the features described in the disclosure herein associated with: for joint data and control in retransmissions retransmitted data may be mapped to more reliable bit sub-channels (Scheme A); or for joint data and control in retransmissions, more PC frozen bit set may be allocated for retransmitted data (Scheme B). If the transmitter does decide to allocate more PC frozen bits for the failure data, the corresponding HARQ schemes may include one or more of the features described in the disclosure herein associated with: for joint data and control in retransmissions retransmitted data may be mapped to more reliable bit sub-channels (Scheme A); and/or in joint data and control in retransmissions, more reliable bit channels and more PC frozen bit set for retransmitted data (Scheme C).

Once the HARQ scheme decision is made, the transmitter may apply the corresponding coding scheme(s). This decision may be communicated to the receiver so that it may do the proper decoding. Table 2 provides an exemplary HARQ scheme list, where the scheme index may be communicated between transmitter and receiver. The receiver may determine the HARQ coding based on decoding the HARQ scheme index.

TABLE 2

Exemplary HARQ scheme list

| HARQ scheme index | HARQ scheme | HARQ sub-scheme |
|---|---|---|
| 1 | CC-HARQ | |
| 2 | IR-HARQ | |
| 3 | IF-HARQ | Failure data only, with the same mother codeword length |
| 4 | IF-HARQ | Failure data only, with increased mother codeword length |
| 5 | IF-HARQ | Joint data and new control information, with increased data priority |
| 6 | IF-HARQ | Joint data and new control information, with mroe PC frozen bits for data |
| 7 | IF-HARQ | Joint data and new control information, with increased data priority and more frozen bits for data |

This HARQ scheme may be jointly transmitted with Redundancy Version (RV) in the Downlink Control Information (DCI). The 3 bits HARQ schemes (e.g., to indicate different HARQ schemes such as the above 7 different values in Table 2) may be put in the DCI.

A device for communicating using ultra-reliable, low latency (URLLC) communication, may include a processor configured to receive a NACK associated with an ultra-reliable, low latency transmission, comprising control information and URLLC data. The device may be configured to determine whether a received NACK was sent with CC-HARQ, IR-HARQ, or IF-HARQ. If the received NACK was sent with CC_HARQ, the device may be configured to send a CC-HARQ retransmission. If the received NACK was sent with IF-HARQ, the processor may be configured to apply an IF-HARQ response. If the received NACK was IR-HARQ coded, the processor may be configured to send an IR-HARQ retransmission. The processor may be configured to determine whether to send the CC-HARQ or the IR-HARQ retransmission based on at least one device capability, a data QoS, and/or at least one available resource for retransmission.

The processor may be configured (e.g., if an IF HARQ NACK was received) to determine that (i) the URLLC data without control information needs to be retransmitted and to increase a mother code length of the URLLC data; or (ii) the URLLC data and the control information needs to be retransmitted. The processor may further be configured to generate a retransmission with the determined URLLC data to be transmitted without the control information with an increased mother code length or to generate a retransmission of the URLLC data and the control information to be transmitted with the URLLC data mapped to a first bit channel having a reliability that is greater than a bit channel used for the URLLC transmission. The processor may be configured to polar code the retransmission. The processor may be further configured to determine whether and how to use parity check frozen bits for retransmitting the URLLC data or the URLLC data and the control information. If the processor determines to use parity check frozen bits, the processor may be configured to apply parity check frozen bits to the transmission; and retransmit the retransmission with IF HARQ. The device may be a wireless transmit/receive unit or infrastructure equipment(s) of a wireless communication system.

The processor may be configured to encode the URLLC data or the URLLC data and the control information by code block segmentation, bit channel mapping, rate matching, multiplexing, and code block concatenation.

The processor may be configured to receive an ACK or NACK, for the retransmission that indicates whether a retransmission is needed.

The bit channel mapping may include assigning URLLC data to be retransmitted to a most reliable input bit sub-channel of the polar codes to increase the priority of the URLLC data to be retransmitted.

The processor may be configured to generate the retransmission using a reduced coding rate relative to a coding rate used for the transmission and/or assign a higher priority to the URLLC data to be transmitted.

Communicating using ultra-reliable, low latency (URLLC) communication may include receiving a HARQ-NACK associated with an ultra-reliable, low latency (URLLC) transmission, the URLLC transmission comprising control information and URLLC data; determining that the HARQ-NACK was IF-HARQ coded; determining to retransmit (i) the URLLC data without control information or (ii) the URLLC data and the control information; generating a first retransmission comprising (i) the URLLC data polar coded with an increased mother code length if it was determined to retransmit the URLLC data without the URLCC control information; or (ii) the URLLC data and the control information polar coded, with the URLLC data mapped to a first bit channel having a reliability that is greater than a second bit channel, if it was determined to retransmit the URLLC data and the control information; determining whether to use parity check frozen bits for retransmitting the URLLC data or the URLLC data and the control information, and if it is determined to use parity check frozen bits, applying parity check frozen bits to the retransmission; and sending the first retransmission with IF HARQ.

Communicating using ultra-reliable, low latency (URLLC) communication may include receiving an ACK or NACK for the first retransmission that indicates whether a second retransmission should be sent and/or encoding the URLLC data or the URLLC data and the control information by code block segmentation, bit channel mapping, rate matching, multiplexing, and code block concatenation.

Generating the retransmission may include using a reduced coding rate relative to a coding rate used for the transmission.

Communicating using ultra-reliable, low latency (URLLC) communication may include determining whether the received HARQ-NACK was sent with CC-HARQ or IR-HARQ coding, and if the received HARQ-NACK was CC-HARQ coded, sending a CC-HARQ retransmission, and if the received HARQ-NACK IR-HARQ was coded, sending an IR-HARQ retransmission.

Communicating using ultra-reliable, low latency (URLLC) communication may include determining whether to send the CC-HARQ or the IR-HARQ retransmission based on at least one device capability, a data QoS, and/or at least one available resource for retransmission.

Each of the computing systems described herein may have one or more computer processors having memory that are configured with executable instructions or hardware for accomplishing the functions described herein including determining the parameters described herein and sending and receiving messages between entities (e.g., WTRU and network) to accomplish the described functions. The processes described above may be implemented in a computer program, software, and/or firmware incorporated in a computer-readable medium for execution by a computer and/or processor.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A device comprising:
a processor configured to:
receive a hybrid automatic repeat request negative acknowledgement (HARQ-NACK) information associated with a transmission, wherein the transmission comprises a first control information and data;
determine that the received HARQ-NACK information uses an incremental freezing HARQ (IF-HARQ) retransmission scheme;
determine whether a retransmission associated with the transmission comprises a retransmission of the data without the first control information or a retransmission of the data and a transmission of a second control information; and
send a retransmission using the IF-HARQ retransmission scheme, wherein:
on a condition that the retransmission is the retransmission of the data without the first control information, the retransmission comprises polar encoded data, wherein the data is polar encoded using a first mother code length that is greater than a second mother code length used for the transmission, and
on a condition that the retransmission is the retransmission of the data and the transmission of the second control information, the retransmission comprises polar encoded data and polar encoded second control information, wherein the polar encoded data is mapped to a first bit channel and the polar encoded second control information is mapped to a second bit channel, and wherein the first bit channel has a reliability that is greater than the second bit channel.

2. The device of claim 1, wherein the device comprises either a wireless transmit/receive unit or a node B.

3. The device of claim 1, wherein the processor is further configured to receive an acknowledgement (ACK) or a negative acknowledgement (NACK) for the first retransmission that indicates whether a second retransmission should be sent.

4. The device of claim 1, wherein being configured to send retransmission comprising the polar encoded data or the polar encoded data and the polar encoded second control information comprises being configured to perform code block segmentation, bit channel mapping, rate matching, multiplexing, and code block concatenation.

5. The device of claim 1, wherein the polar encoded data mapped to the first bit channel comprises the data polar encoded mapped to a most reliable input bit sub-channel.

6. The device of claim 1, wherein the processor being configured to send the retransmission comprises being configured to use a reduced coding rate relative to a coding rate used for the transmission.

7. The device of claim 1, wherein the processor being configured to determine that the received HARQ-NACK information uses IF-HARQ retransmission scheme is based on at least one of a device capability, a data quality of service (QoS), or at least one available resource for retransmission.

8. A retransmission method comprising: +
receiving a hybrid automatic repeat request negative acknowledgement (HARQ-NACK) information associated with a transmission, wherein the transmission comprises a first control information and data;
determining that the received HARQ-NACK information uses an incremental freezing HARQ (IF-HARQ) retransmission scheme;
determining whether a retransmission associated with the transmission comprises a retransmission of the data without the first control information or a retransmission of the data and a transmission of a second control information; and sending a retransmission using the IF-HARQ retransmission scheme, wherein:
- on a condition that the retransmission is the retransmission of the data without the first control information, the retransmission comprises polar encoded the data using a first mother code length that is greater than a second mother code length used for the transmission, and
- on a condition that the retransmission is the retransmission of the data and the transmission of the second control information, the retransmission comprises polar encoded data and polar encoded second control information, wherein the polar encoded data is mapped to a first bit channel and the polar encoded second control information is mapped to a second bit channel, and wherein the first bit channel has a reliability that is greater than the second bit channel.

9. The method of claim 8, further comprising receiving an acknowledgement (ACK) or a negative acknowledgement (NACK) for the first retransmission that indicates whether an additional retransmission should be sent.

10. The method of claim 8, wherein sending retransmission comprising the polar encoded data or the polar encoded data and the polar encoded second control information comprises performing code block segmentation, bit channel mapping, rate matching, multiplexing, and code block concatenation.

11. The method of claim 8, wherein the polar encoded data mapped to the first bit channel comprises the polar encoded data mapped to a most reliable input bit subchannel.

12. The method of claim 8, wherein sending the retransmission comprises using a reduced coding rate relative to a coding rate used for the transmission.

13. The method of claim 8, wherein determining that the received HARQ-NACK information uses IF-HARQ retransmission scheme is based on at least one of a device capability, a data quality of service (QoS), or at least one available resource for retransmission.

14. The device of claim 1, wherein the processor is further configured to apply parity check frozen bits to the retransmission.

15. The device of claim 1, wherein on condition that the retransmission is the retransmission of the data without the first control information, the processor is configured to apply the IF-HARQ retransmission scheme to the data of the transmission.

16. The method of claim 8, further comprising applying parity check frozen bits to the retransmission.

17. The method of claim 8, wherein on condition that the retransmission is the retransmission of the data without the first control information, applying the IF-HARQ retransmission scheme to the data of the transmission.

18. The device of claim 1, wherein the data is an ultra-reliable low latency communication (URLLC) data and second control information comprises a new control message.

19. The method of claim 8, wherein the data is an ultra-reliable low latency communication (URLLC) data and second control information comprises a new control message.

* * * * *

UNITED STATES PATENT AND TRADEMARK OFFICE
CERTIFICATE OF CORRECTION

PATENT NO. : 11,251,908 B2
APPLICATION NO. : 16/473552
DATED : February 15, 2022
INVENTOR(S) : Ye et al.

It is certified that error appears in the above-identified patent and that said Letters Patent is hereby corrected as shown below:

In the Claims

Claim 3, Column 24, Line 37: delete "first"

Claim 3, Column 24, Line 38: add -- an additional -- and delete "a second"

Claim 8, Column 25, Line 9: delete "the"

Claim 9, Column 25, Line 22: delete "first"

Signed and Sealed this
Thirty-first Day of May, 2022

Katherine Kelly Vidal
*Director of the United States Patent and Trademark Office*